Aug. 26, 1952  A. P. CLARK  2,608,110
SAW GRINDER

Filed March 5, 1951  3 Sheets-Sheet 1

INVENTOR.
ANTOINE P. CLARK
BY
Charles R. Werner
ATTORNEY

Aug. 26, 1952  A. P. CLARK  2,608,110
SAW GRINDER
Filed March 5, 1951  3 Sheets-Sheet 2
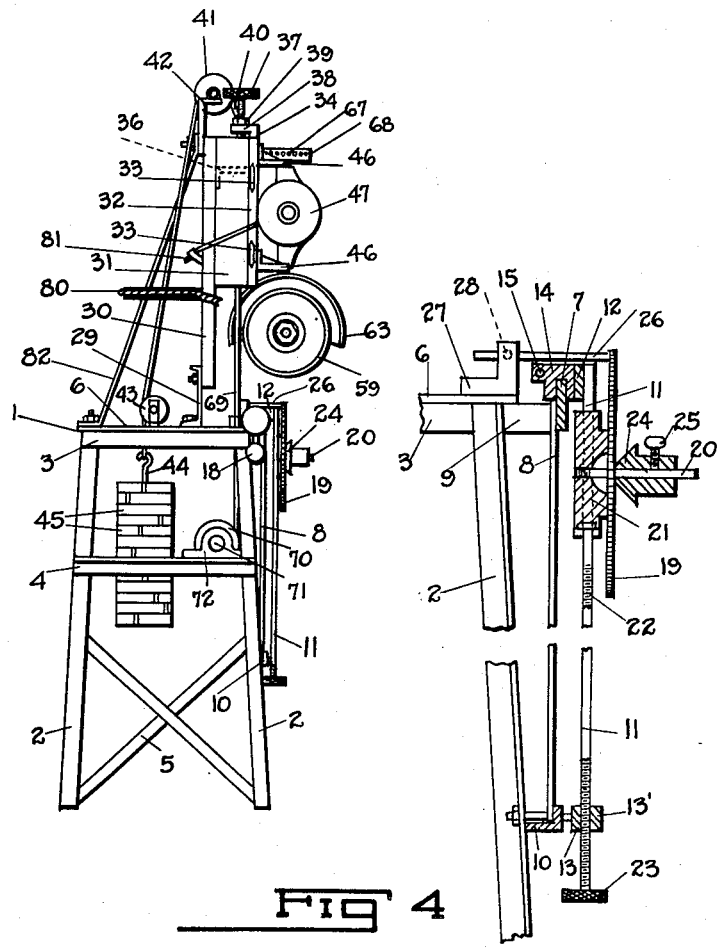
Fig 3
Fig 4
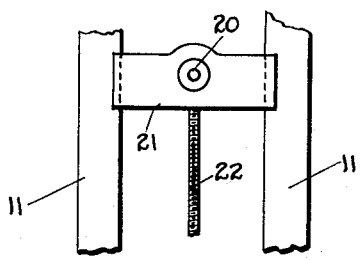
Fig 5
INVENTOR.
ANTOINE P. CLARK
BY
Charles R. Werner
ATTORNEY

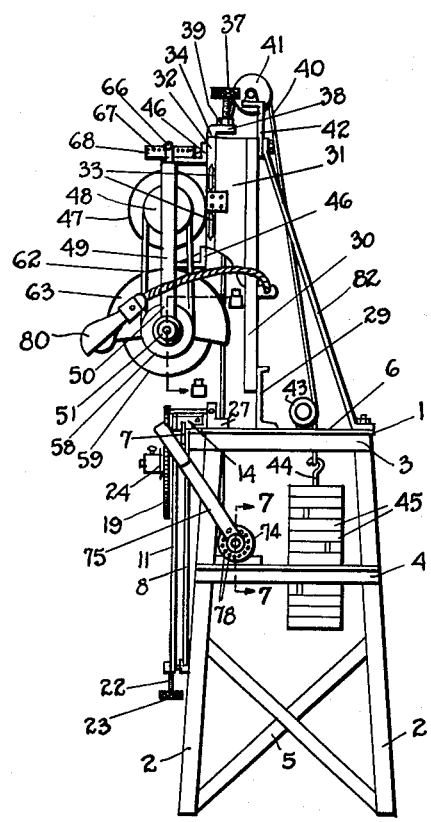
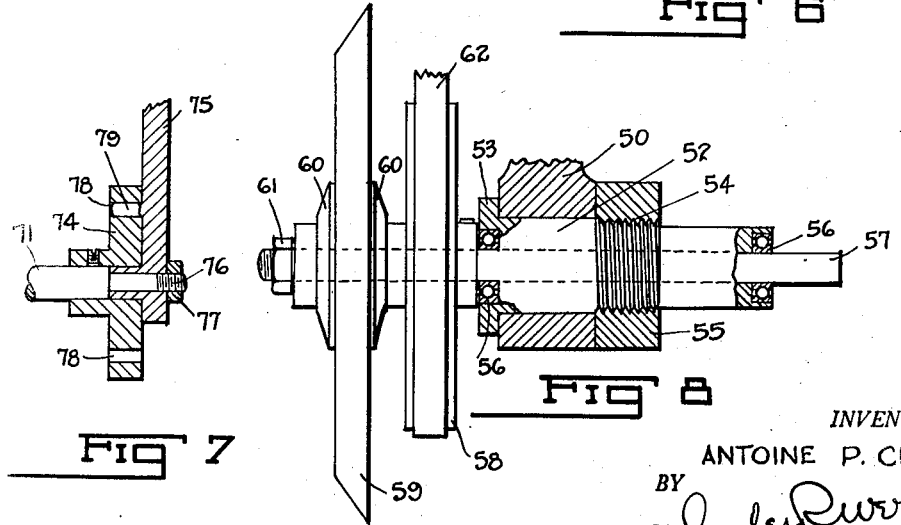

Patented Aug. 26, 1952

2,608,110

UNITED STATES PATENT OFFICE 2,608,110

SAW GRINDER

Antoine P. Clark, Wichita, Kans.

Application March 5, 1951, Serial No. 213,896

5 Claims. (Cl. 76—41)

This invention relates in general to saw grinding machines and in particular to a grinder device for circular saw blades in which the blade is held in fixed position while the grinding wheel is brought down against the saw blade a predetermined depth and at a set angle, repeating the process for each tooth of the saw and changing the angle for the opposite side of each tooth.

Insofar as I am aware in other devices of this nature the saw blade is moved into contact with the grinding wheel and I have found that a reversal of this procedure makes for much more rapid and accurate grinding of the saw blade.

In my device universal adjustments are provided so that a wide range of saw sizes may be accommodated; the angular relation between the saw and grinding wheel can be changed; and the grinding wheel can be moved into and out of grinding relation with the saw blade with a minimum of effort.

The objects of the invention are, first; to provide a saw grinding machine in which the saw blade can be easily, quickly and securely mounted preparatory to grinding thereof.

Second; to provide a saw grinding mahine in which the saw blade is mounted for easy and rapid vertical and lateral adjustment in relation to the grinding wheel.

Third; to provide a saw grinding machine in which the grinding wheel is securely held for rotative movement in an arbor designed for rapid and easy installation and removal in the event it is necessary to change the grinding wheel.

Fourth; to provide a saw grinding machine in which the grinding wheel is carried in a pivotal support, angularly movable to and lockable in any one of a number of positions in angular relation to the saw blade.

Fifth; to provide a saw grinding machine in which the motor drive for the grinding wheel is carried on a vertically movable support together with the grinding wheel which is angularly adjustable on said first mentioned support.

Sixth; to provide a saw grinding machine having manual control means for moving the motor and grinding wheel sliding support vertically into and out of grinding contact with the saw blade.

Seventh; to provide a saw grinding machine in which an adjustable stop member is provided for limiting the movement of the saw grinding wheel to obtain the desired depth of cut on the saw blade.

Eighth; to provide a saw grinding machine in which a counterbalance is employed on a vertically movable motor and grinding wheel support whereby manual movement of said support will be easy and effortless.

Ninth; to provide a saw grinding machine in which an adjustable handle is provided with linkage to the motor and grinding wheel support whereby the relation of the handle to the operator will remain the same although the grinding wheel relation to any size saw blade may be changed.

Other objects and advantages as well as the construction and operation of my invention will be apparent by reference to the following description in connection with the accompanying drawings in which:

Fig. 3 is a left side elevational view of the saw grinding device.

Fig. 4 is an enlarged detail view partly in section and partly in elevation of a fragmentary portion of the device illustrating the saw blade mounting arrangement on a vertically and laterally movable mount.

Fig. 5 is a fragmentary, front detail view of the saw blade mounting member.

Fig. 6 is a right side elevational view of the invention.

Fig. 7 is an enlarged, fragmentary, detail sectional view on the line 7—7 of Fig. 6 through the control handle mounting.

Fig. 8 is an enlarged fragmentary detail view, partly in section and partly in elevation on the line 8—8 of Fig. 6 through the grinding wheel and mounting arbor therefor.

Figure 1:
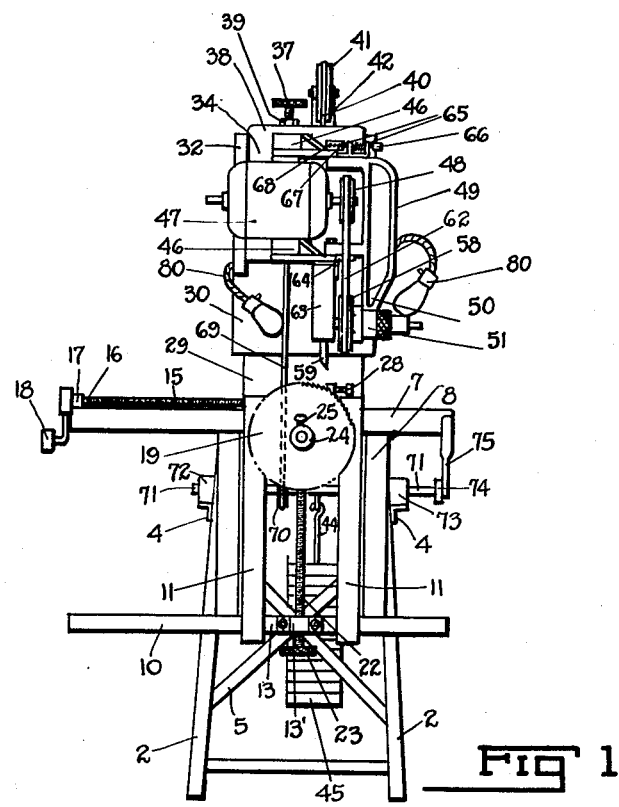
Fig. 1 is a front elevational view of the saw grinding device comprising my invention.

Referring now to the drawings by numerals of reference 1 designates a suitable stand with standards or legs 2, top cross members 3, intermediate cross members 4, bracing 5 and top 6.

A top lateral support 7 is carried by vertical members 8 secured to stand 1 by spacers 9 and lower angle 10. (See Figs. 1 and 4.) The laterally movable saw blade frame comprises a pair of side members 11, an upper cross member 12 and lower cross member 13. The upper cross member 12 has a slidable block 14 resting on lateral support 7, a threaded rod 15 threadedly engaging block 14 and having end 16 rotatably carried in block 17 on lateral support 7, a suitable handle 18 being provided for imparting rotative movement to rod 15.

The saw blade 19 is mounted on shaft 20 carried by vertically slidable block 21 suitably engaging the side members 11 for vertical movement thereon (see Fig. 5), a vertical screw or threaded rod 22 engaging the block 21 and threadedly supported in block 13' on the lower cross member 13, hand knob 23 facilitating rotation of the screw 22.

A cone collar 24 on shaft 20 is adapted to bear against the saw blade 19 to center same, thumb screw 25 locking the collar 24 in blade holding position. An adjustable stop pin 26 is mounted in guide block 27 on the top 6, screw 28 locking the stop pin in adjusted position. (See Figs. 1, 4 and 6.)

Figure 2:
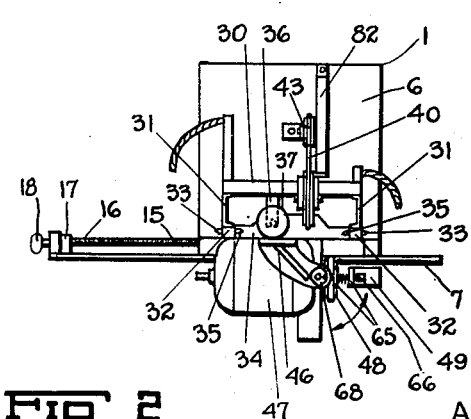
Fig. 2 is a top plan view of the same.

A cross member 29 is secured to top 6 and carries vertical plate 30 at each side of which is a flange 31 carrying guide plates 32 in which guide wheels 33 are rotatably mounted. A vertically slidable plate 34 has edge grooves 35 in which the guide wheels 33 ride (see Fig. 2), there being no play between the plate 34 and the wheels 33. Downward movement of plate 34 is limited by stop 36 against which adjustable stop screw 37 may strike, said screw being threadedly carried in flange 38 on plate 34 with suitable lock nut 39.

A cable 40 is secured to flange 38 and passes over pulley 41 suitably supported in bracket 42 on vertical plate 30, a second pulley 43 mounted on stand top 6 guiding the cable through an opening in said top, terminating with weight rod 44 on which a plurality of counterbalance weights 45 may be carried.

A pair of brackets 46 are suitably secured to slidable plate 34, motor 47 being mounted to the brackets, a pulley 48 carried on the motor shaft. Pivotal bracket 49 is suitably carried by brackets 46 and has depending arm 50 in which is removably carried an arbor 51 shown in detail in Fig. 8.

The arbor comprises a collar 52 with flange 53 and threaded portion 54, knurled nut 55 holding the collar 52 firmly in position in the depending arm 50. Bearings 56 are provided at each end of the collar and shaft 57 is securely held in the bearings in rotative but fixed endwise relation and carries pulley 58, grinding wheel 59 with suitable washers 60, nut 61 holding the grinding wheel secure on the shaft. Belt 62 operatively connects pulley 58 with the pulley 48 on the motor shaft. A grinding wheel guard 63 is suitably positioned over the grinding wheel and is supported on bracket 49 by flange 64.

At the top of bracket 49 is carried a pair of spaced flanges 65 in which spring urged pin 66 is mounted, one end of the pin being adapted to engage any one of the openings 67 in segment 68 carried on upper bracket 46, pivotal movement of the bracket 49 being accomplished by pulling out on pin 66 to disengage same from opening 67, manually moving the bracket to the desired position and releasing pin 66 for urging by its spring into a new opening to retain the bracket 49 in fixed angular relation to the grinding wheel.

To lower the sliding plate 34 and its attached motor driven grinding wheel, a cable 69 is secured to the lower end of said plate 34 and passes downwardly through top 6 and fastens to pulley 70 on shaft 71, suitably carried in supports 72 and 73. (See Fig. 1.) A flanged collar 74 is secured to one end of the shaft 71, handle 75 being mounted on reduced extension 76 of shaft 71, nut 77 holding said handle in fixed endwise position on the extension 76. The collar 74 is provided with a plurality of annular openings 78 in any one of which pin 79 on flanged collar 74 may be positioned, the purpose of this adjustable arrangement being to properly position the handle 75 regardless of the size saw being sharpened or the size of grinding wheel being used as will be further explained hereinafter. (See Figs. 6 and 7.)

Suitable gooseneck lamps 80 may be provided for illumination of the work, the power cord 81 from the motor 47 being connected in a suitable manner to a current source through a suitable switch (not shown). A brace 82 may be positioned between the stand top 6 and the upper end of vertical plate 30.

In the operation of my saw grinding machine, the blade to be sharpened is applied to shaft 20, the cone member or collar 24 forcing the blade firmly against block 21 and centering the blade on shaft 20 in the event the opening in the blade is larger than the diameter of shaft 20.

Hand knob 23 is rotated, turning screw 22, raising or lowering block 21 and saw blade 19 as necessary to bring the edge of the blade into close proximity and proper relation to blade stop pin 26 which is moved to and secured in abutting relation to the blade to prevent rearward movement thereof during operation of the grinding wheel.

With the saw blade properly positioned the angular relation of the grinding wheel to the saw blade may be set by pulling pin 66 against the spring action and swinging bracket 49 until the desired angle is obtained, release of pin 66 permitting same to lock the bracket in fixed adjusted position by engagement of said pin with one of the openings 67 in fixed segment 68.

Vertical adjustment of the grinding wheel is achieved by turning stop screw 37 until its point of contact with the stop 36 coincides with the desired depth of cut on the saw blade. When saw blades of different diameters are to be sharpened it is necessary to change the relation of handle 75 with shaft 71, this being done merely by removing nut 77, slipping handle 75 sidewards on reduced shaft 76 until pin 79 is free of opening 78, then rotating handle 75 on reduced shaft 76 until the desired position is reached and then moving said handle sidewards until pin 79 engages a new opening 78. In this way the handle can always be maintained at its same relation to the operator of the device regardless of the size of saw blade being sharpened and the relation between the saw blade and grinding wheel.

Sufficient counterweights 45 are employed to reduce to a minimum the effort needed to move the grinding wheel, motor and supporting and driving members downwardly or upwardly as the case may be.

When the teeth of the saw blade have been ground to one angle it is a simple matter to change the angular relation of the grinding wheel as hereinbefore explained to grind the teeth at another angle for proper sharpening of said saw blade teeth. Also, the operator can easily rotate the saw blade to present a fresh saw tooth to the grinding wheel.

The grinding wheel arbor 51 is easily and quickly removed by turning the knurled hand nut 55, removing belt 62 from pulley 58 and slipping the arbor out of opening in end 50 of bracket 49. This arrangement is desirable for rapid changing of grinding wheels for sharpening different type circular saw blades.

From the foregoing it will be apparent that I have provided a relatively simple and easily operated and accurate saw grinding device which makes for easier, quicker and more expeditious sharpening of circular saw blades. It will also be seen that my device is universally adjustable to many different sizes of saw blades, the adjustment of the machine requiring very little time and effort.

Obviously, changes in form, proportion and details of construction may be resorted to without departing from the spirit of my invention and I reserve all rights to such changes as come within the scope of these specifications and the claims which follow.

What I claim as new and desire to secure by Letters Patent is:

1. A saw grinding machine comprising a vertically and laterally adjustable saw support, a vertical guide frame above the saw support, a vertically movable support in the guide frame, a pivoted bracket carried by said second mentioned support, a grinding wheel carried by the bracket, driving means for the grinding wheel carried by the second mentioned support, means for locking the bracket to set the grinding wheel at any predetermined angular relation to the saw, a cable secured adjacent the top of the second mentioned support, pulleys for the cable, a counterbalance secured to the cable to substantially balance the weight of the second mentioned support, bracket, grinding wheel, driving means therefor, and bracket locking means, a second cable secured adjacent the bottom of the second mentioned support and depending downwardly, operating means including a handle for actuating the depending cable to move the grinding wheel into and out of saw grinding position.

2. The structure as specified in claim 1, said bracket locking means comprising an arcuated member on the pivoted member, a plurality of spaced openings in the arcuated member, a spring mounted detent on the vertically movable support, said detent being adapted to engage any one of the spaced openings in the arcuated member.

3. The structure as specified in claim 1, the saw support including a vertically slidable block, a saw receiving shaft extending transversely from the block, a concavity in the block at the shaft, a saw retaining collar receivable by the shaft, a substantially conical portion on the collar adapted to engage the saw and enter the concavity in the block to center the saw on the shaft.

4. The structure as specified in claim 1, and a plurality of wheel bearings along each side of the vertical guide frame, a slot along each vertical side of the vertically movable support, said wheel bearings operating in the slots whereby friction between the guide frame and support is minimized and the support is maintained in accurate saw grinding alignment.

5. The structure as specified in claim 1, said operating means including a shaft, a disc on the shaft, a plurality of openings in the disc, a pin on the handle adapted to be received in any one of the openings in the disc, said handle being disengageable from the shaft and the disc, and a locking member for locking the handle in any predetermined position on the shaft.

ANTOINE P. CLARK.

REFERENCES CITED

The following references are of record in the file of this patent:

UNITED STATES PATENTS

| Number | Name | Date |
|---|---|---|
| 183,931 | Howland | Oct. 31, 1876 |
| 574,855 | Schofield | Jan. 5, 1897 |
| 580,875 | Littlejohns | Apr. 20, 1897 |
| 813,910 | McClellan | Feb. 27, 1906 |
| 980,304 | Miner | Dec. 29, 1908 |
| 1,179,752 | Pangburn | Apr. 18, 1916 |
| 1,401,696 | Hedstrom | Dec. 27, 1921 |
| 1,480,172 | Majewicz | Jan. 8, 1924 |
| 2,379,642 | Kiechle | July 3, 1945 |
| 2,519,735 | Boutin | Aug. 22, 1950 |

FOREIGN PATENTS

| Number | Country | Date |
|---|---|---|
| 16,193 | Great Britain | June 10, 1915 |
| 149,484 | Switzerland | Sept. 15, 1931 |
| 438,456 | Great Britain | Nov. 18, 1935 |